United States Patent
Hua et al.

(10) Patent No.: US 11,849,321 B2
(45) Date of Patent: *Dec. 19, 2023

(54) SYSTEMS AND METHODS FOR TEMPORARILY BARRING UE NETWORK SLICE USAGE

(71) Applicant: Verizon Patent and Licensing Inc., Basking Ridge, NJ (US)

(72) Inventors: Suzann Hua, Beverly Hills, CA (US); Ye Huang, San Ramon, CA (US); Chien-Yuan Huang, Basking Ridge, NJ (US); Parry Cornell Booker, Arlington, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/749,406

(22) Filed: May 20, 2022

(65) Prior Publication Data

US 2022/0312210 A1 Sep. 29, 2022

Related U.S. Application Data

(63) Continuation of application No. 17/210,841, filed on Mar. 24, 2021, now Pat. No. 11,375,374.

(51) Int. Cl.
*H04W 12/082* (2021.01)
*H04W 12/72* (2021.01)

(52) U.S. Cl.
CPC ......... *H04W 12/082* (2021.01); *H04W 12/72* (2021.01)

(58) Field of Classification Search
CPC ............................ H04W 12/72; H04W 12/082
(Continued)

(56) References Cited

U.S. PATENT DOCUMENTS

2019/0159024 A1* 5/2019 Rost .................. H04W 12/0433
2019/0246334 A1* 8/2019 Wang .................... H04W 48/16
(Continued)

FOREIGN PATENT DOCUMENTS

| CA | 3036486 | 12/2018 |
|---|---|---|
| CN | 106572516 | 4/2017 |

(Continued)

OTHER PUBLICATIONS

Vittal et al., "Adaptive Network Slicing with Multi-Site Deployment in 5G Core Networks," 2020 6th IEEE Conference on Network Softwarization (NetSoft), Ghent, Belgium, 2020, pp. 227-231, doi: 10.1109/NetSoft48620.2020.9165512. (Year: 2020).*

(Continued)

*Primary Examiner* — Peter C Shaw

(57) ABSTRACT

Systems and method are provided for a temporary network slice usage barring service within a core network. A network device in the core network receives a slice barring information message for an application function (AF). The slice barring information message includes a unique subscriber identifier associated with a user equipment (UE) device to be barred from a network slice and indicates a barring expiration time. The network device stores barring parameters based on the slice barring information message. The barring parameters include a slice identifier associated with the AF, the unique subscriber identifier, and the barring expiration time. The network device sends a barring instruction message to another network device associated with the network slice. The barring instruction message includes the unique subscriber identifier and the barring expiration time. The other network device enforces temporary barring of the UE device from the network slice based on the barring instruction message.

20 Claims, 8 Drawing Sheets

(58) Field of Classification Search
USPC .......................................................... 726/3
See application file for complete search history.

(56) References Cited

U.S. PATENT DOCUMENTS

| | | | |
|---|---|---|---|
| 2019/0281494 A1* | 9/2019 | Chan ..................... | H04W 72/56 |
| 2019/0357119 A1* | 11/2019 | Hong ..................... | H04W 48/02 |
| 2020/0068430 A1* | 2/2020 | Chan ..................... | H04L 47/11 |

FOREIGN PATENT DOCUMENTS

| | | | | |
|---|---|---|---|---|
| CN | 106572516 A | * | 4/2017 | ......... H04L 41/5051 |
| CN | 107094094 | | 8/2017 | |
| CN | 110113328 | | 8/2019 | |
| CN | 109257769 B | * | 9/2020 | ............ H04W 28/02 |
| EP | 3509355 | | 7/2019 | |
| KR | 2018-0090189 | | 8/2018 | |
| KR | 20180090189 A | * | 8/2018 | ............ H04F 48/02 |
| KR | 20180090189 A1 | * | 10/2018 | ............ H04W 48/02 |
| KR | 20190127820 A | * | 11/2019 | ............ H04F 60/00 |
| KR | 20190127820 A1 | * | 11/2019 | ............ H04W 48/02 |
| WO | 2017/119844 | | 7/2017 | |
| WO | WO-2017119844 A1 | * | 7/2017 | ............ H04W 16/00 |
| WO | 2018/028717 | | 2/2018 | |
| WO | WO-2018028717 A1 | * | 2/2018 | .......... H04W 74/002 |
| WO | WO-2018236196 A1 | * | 12/2018 | ............ H04W 48/02 |
| WO | 2019/030429 | | 2/2019 | |
| WO | WO-2019030429 A1 | * | 2/2019 | ............ H04W 48/04 |

OTHER PUBLICATIONS

Bakri et al., A. Ksentini and M. Bouaziz, "Data-Driven RAN Slicing Mechanisms for 5G and Beyond," in IEEE Transactions on Network and Service Management, vol. 18, No. 4, pp. 4654-4668, Dec. 2021, doi: 10.1109/TNSM.2021.3098193. (Year: 2021).*

Zhou et al., "Dynamic Network Slice Scaling Assisted by Prediction in 5G Network," in IEEE Access, vol. 8, pp. 133700-133712, 2020, doi: 10.1109/ACCESS.2020.3010623. (Year: 2020).*

Dong et al., "Latency Guarantee for Multimedia Streaming Service to Moving Subscriber with 5G Slicing," 2018 International Symposium on Networks, Computers and Communications (ISNCC), Rome, Italy, 2018, pp. 1-7, doi: 10.1109/ISNCC.2018.8531002. (Year: 2018).*

Turan et al., "Reinforcement Learning based Adaptive Access Class Barring for RAN Slicing," 2021 IEEE International Conference on Communications Workshops (ICC Workshops), Montreal, QC, Canada, 2021, pp. 1-6, doi: 10.1109/ICCWorkshops50388.2021.9473684. (Year: 2021).*

Li et al., P. Schliwa-Bertling, M. Folke and M. Stattin, "An Overview of 5G System Accessibility Differentiation and Control," in IEEE Communications Standards Magazine, vol. 5, No. 4, pp. 104-111, Dec. 2021, doi: 10.1109/MCOMSTD.0001.2000067. (Year: 2021).*

Mancuso et al., "Modeling MTC and HTC Radio Access in a Sliced 5G Base Station," in IEEE Transactions on Network and Service Management, vol. 18, No. 2, pp. 2208-2225, Jun. 2021, doi: 10.1109/TNSM.2020.3034688. (Year: 2021).*

Kaloxylos, "A Survey and an Analysis of Network Slicing in 5G Networks," in IEEE Communications Standards Magazine, vol. 2, No. 1, pp. 60-65, Mar. 2018, doi: 10.1109/MCOMSTD.2018.1700072. (Year: 2018).*

Hani, et al., "A Novel Technique of Improving 5G Networks with Round Robin Scheduling in Preamble Transmission", IEEE, doi:10.1109/IAC3T.2018.8674018, 2018, pp. 11-16. (Year: 2018).

Li, et al., "An Overview of 5G System Accessibility Differentiation and Control", IEEE, doi: 10.1109/MCOMSTD.0001.2000067, pp. 104-111, Dec. 2021.

Tello-Oquendo, et al., "Performance Analysis and Optimal Access Class Barring Parameter Configuration in LTE-A Networks With Massive M2M Traffic", IEEE, doi: 10.1109/TVT.2017.2776868, pp. 3505-3520, Apr. 2018. (Year: 2018).

* cited by examiner

SYSTEMS AND METHODS FOR TEMPORARILY BARRING UE NETWORK SLICE USAGE

CROSS REFERENCE TO RELATED APPLICATION

This patent application is a continuation of U.S. patent application Ser. No. 17/210,841, entitled "Systems and Methods for Temporarily Barring UE Network Slice Usage" and filed on Mar. 24, 2021, the disclosure of which is incorporated herein by reference in its entirety.

BACKGROUND

A Fifth Generation system (5GS) may include a core network that supports and manages 5G radio access networks (RANs), providing various services and enabling connections to other networks (e.g., connections to the Internet, etc.). Different types of services in 5GS may be implemented using network slicing. Network slicing is a form of virtual network architecture that enables multiple logical networks to be implemented on top of a common shared physical infrastructure using software defined networking (SDN) and/or network function virtualization (NFV). Each logical network, referred to as a "network slice," may encompass an end-to-end virtual network with dedicated storage and/or computation resources and may be configured to implement a different set of requirements.

DETAILED DESCRIPTION OF THE PREFERRED EMBODIMENTS

Figure 1:
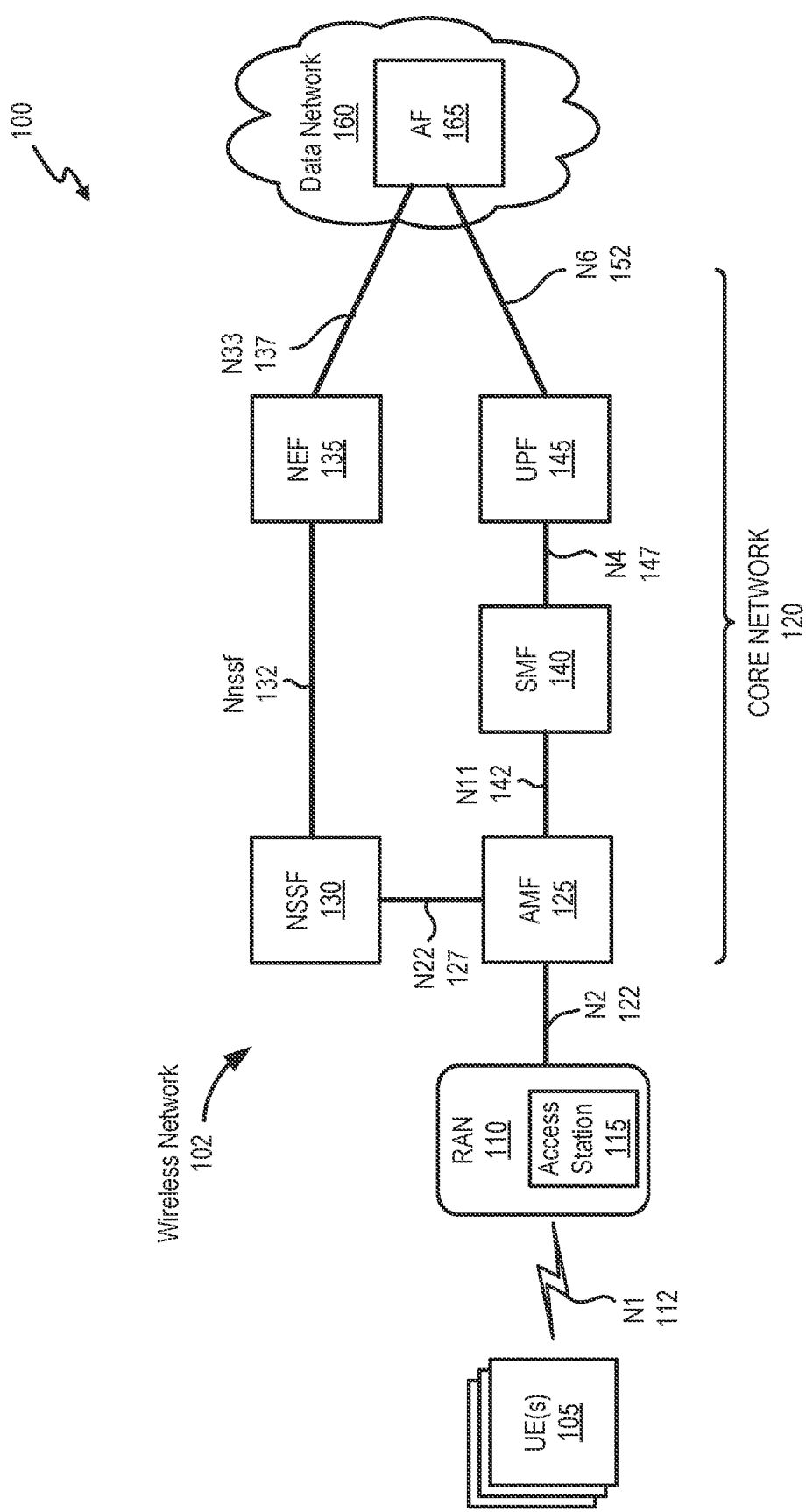
FIG. 1 is a diagram that depicts an exemplary network environment in which systems and methods described herein may be implemented.

The following detailed description refers to the accompanying drawings. The same reference numbers in different drawings may identify the same or similar elements.

When a network slice is supported end-to-end by 5GS, a network slice may be dedicated to serve a single application server. Each application server has terms and conditions (e.g., determined by the application service provider) for users to use and access the service. When a user violates the terms and conditions, the application server may take an action usually after the user has attempted to log in to the application server, while some rogue users may continue to attempt to login to the server even after the initial action. This type of enforcement, thus, results in not only unwanted traffic to the application server, but also unwanted traffic over the 5G network.

While today's networks support different types of service barring, service barring at slice level, particularly temporary slice usage barring, is not supported.

Systems and methods described herein provide a temporary network slice usage barring service. More particularly, the systems and methods enable a 5GS to support temporary barring of slice usage via enhancement to core network components, such as a Network Exposure Function (NEF), a Network Slice Selection Function (NSSF), and an Access and Mobility Management Function (AMF).

According to implementations described herein, an application server (also referred to herein as an application function (AF)) can provide user info to an NEF and instruct the NEF to have the 5G network temporarily bar a UE device from slice usage and thus bar the UE device from accessing the application server. In response, the NEF may send to-be-barred user information to a temporary baring service database at the NSSF. When the UE device attempts to use the slice to access the application server, the AMF communicates with the NSSF and rejects the UE device's request to access the server. In addition, the AMF may provide a backoff timer indicating the temporary barring time. Thus, unwanted access to AF services may be effectively eliminated, while the unwanted network access may also be effectively controlled.

Implementations described herein allow mobile network operators to provide a new temporary network slice usage barring service to application providers. The network slice usage barring service may be leveraged by the application providers as necessary. Since the slice barring is temporary, the systems and methods do not require a UE device to update a list of stored allowed slices. Additionally, the network slice usage barring service may be implemented without impacting other core network functions, such a Unified Data Management (UDM) function, a Unified Data Repository (UDR), and a Policy Control Function (PCF).

According to an implementation, a network device (e.g., an NSSF) in the core network receives slice barring information message for an application function (AF). The slice barring information message may include a unique subscriber identifier to be barred from a network slice and indicates a barring expiration time. The network device may store barring parameters based on the slice barring information message. The barring parameters may include a slice identifier associated with the AF, the unique subscriber identifier, and the barring expiration time. The network device may send a barring instruction message to another network device associated with the network slice. The barring instruction message may include the unique subscriber identifier and may indicate the barring expiration time. The other network device may enforce temporary barring of a user equipment (UE) device from the network slice based on the barring instruction message.

FIG. 1 is a diagram that depicts an exemplary network environment 100 in which systems and methods described herein may be implemented. As shown in FIG. 1, network environment 100 may include a wireless network 102 with a radio access network (RAN) 110 and a core network 120; groups of user equipment (UE) devices 105 (referred to individually and generically as UE 105); and data network 160 that includes an Application Function (AF) 165.

In one implementation, wireless network 102 may be a 5G network, but could be any advanced wireless network that implements network slicing, and may include one or more devices that are physical and/or logical entities interconnected via standardized interfaces. Wireless network 102 provides wireless services and wireless IP connectivity to user devices (such as UEs 105) to provide, for example, data, voice, and/or multimedia services. RAN 110 may include one or more radio access stations (e.g., a 5G gNB, etc.) connected to devices in core network 120.

RAN 110 may allow UE 105 to access core network 120. To do so, RAN 110 may establish and maintain, with participation from UE 105, an over-the-air channel with UE 105; and maintain backhaul channels with core network 120. RAN 110 may convey information through these channels, from UE 105 to core network 120 and vice versa. According to various embodiments, RAN 110 may be implemented according to various wireless technologies (e.g., radio access technology (RAT), etc.), wireless standards, wireless frequencies/bands, and so forth.

Depending on the implementation, RAN 110 may include one or multiple types of access stations 115. For example, access station 115 may include a next generation Node B (gNB) for a 5G NR RAN or another type of wireless node. According to an implementation, access station 115 may include a gNB with multiple distributed components, such as a central unit (CU), a distributed unit (DU), a remote unit (RU or a remote radio unit (RRU)), or another type of distributed arrangement. In some implementations, RAN 110 may include Multi-Access Edge Computing (MEC) clusters, which may be located geographically close to access stations 115, and therefore also close to UEs 105 serviced by access station 115. Depending on the implementations, the MEC clusters may provide some core functions (e.g., described below) at network edges.

Core network 120 (also referred to herein as a "wireless core network") may include one or multiple networks of one or multiple types. According to an implementation, core network 120 may be a next generation core (NGC) network for 5GS. According to different implementations, core network 120 may include, for example, standalone 5G core network components or core components that combine 5G and 4G functionality. Core network 120 may allow the delivery of Internet Protocol (IP) services to UE 105, and may interface with other networks, such as data network 160. In FIG. 1, core network 120 includes an AMF 125, an NSSF 130, an NEF 135, a Session Management Function (SMF) 140, and a User Plane Function (UPF) 145. Although core network 120 may include other 5G core network components, 4G core network components, or another type of core network components, they are not illustrated in FIG. 1 for simplicity. Other embodiments may include additional or different network entities in alternative configurations than those exemplified in FIG. 1.

Data network 160 may include one or multiple networks. For example, data network 160 may be implemented to include a service or an application-layer network, the Internet, an Internet Protocol Multimedia Subsystem (IMS) network, a Rich Communication Service (RCS) network, a cloud network, a packet-switched network, or other type of network that hosts a user device application or service. Depending on the implementation, data network 160 may include various network devices that provide various applications, services, or other type of UE device assets (e.g., servers (e.g., web, application, cloud, etc.), mass storage devices, data center devices), and/or other types of network services pertaining to various network-related functions. According to an implementation described herein, data network 160 may include one or more AFs 165, which provide application services to UEs 105. Mobile network 102 may associate each AF 165 with a network slice to service UEs 105.

UE 105 (also referred to herein as an "end device") may include a device that has computational and wireless communication capabilities to support network slicing. UE 105 may be implemented as a mobile device, a portable device, or a stationary device. UE 105 may be implemented as a user device, a Machine Type Communication (MTC) device, an Internet of Things (IoT) device, an enhanced MTC device (eMTC) (also known as Cat-M1), a NB-IoT device, a machine-to-machine (M2M) device, or some other type of wireless end node. By way of further example, UE 105 may be implemented as a smartphone, a wearable device, a set top box, a telematics system in a vehicle, a smart television, a game system, or some other type of wireless user device. According to various exemplary embodiments, UE 105 may be configured to execute various types of software (e.g., applications, programs, etc.) in conjunction with services provided by an application server (e.g., AF 165). The number and the types of software may vary from one UE 105 to another UE 105. UE 105 may communicate with access stations 115 (e.g., a gNB) in RAN 110 via an N1 interface 112.

For certain applications, UE 105 may store UE Route Selection Policies (URSP). The URSP framework for 5GS provides traffic steering rules for UE devices and enables a UE device to determine how a certain application should be handled in the context of traffic routing to an appropriate network slice. According to implementations described herein, URSP may include a policy to associate one network slice with one application server (e.g., AF 165). URSP may be stored, for example, in a subscriber identity module (SIM) or modem of UE 105.

AMF 125 may perform registration management, connection management, reachability management, mobility management, lawful intercepts, short message service (SMS) transport for UE 105, management of messages between UE 105 and an SMF (e.g., SMF 140), access authentication and authorization, and location services management. AMF 125 may provide the functionality to support non-3rd Generation Partnership Project (3GPP) access networks, and/or other types of processes. According to implementations described herein, AMF 125 may enforce temporary slice usage barring. AMF 232 may communicate with access stations 115 (e.g., a gNB) in RAN 110 via an N2 interface 122. As described further herein, AMF 125 may communicate with NSSF 130 via an N22 interface 127 that is modified to support the network slice usage barring service. AMF 125 may communicate with SMF 140 via an N11 interface 142.

NSSF 130 may select one or more network slice instances to serve a particular UE 105, determine network slice selection assistance information (NSSAI), determine a particular AMF 125 to serve a particular UE device 105, and/or perform other types of processing associated with network slice selection or management. According to implementations described herein, NSSF 130 may receive barring requests generated by AFs 165, store slice barring information for particular UEs 105, and notify AMF 125 of barring information for enforcement. NSSF 362 may be accessible to NEF 135 via Nnssf interface 132.

NEF 135 may expose capabilities and events to other NFs, including third party NFs, AFs, edge computing NFs, and/or other types of NFs. Furthermore, NEF 135 may secure provisioning of information from external applications to core network 120, translate information between core network 150 and devices/networks external to core network 120, support a Packet Flow Description (PFD) function, and/or perform other types of network exposure functions. According to implementations described herein, NEF 135 may receive barring requests for specific UEs 105 from AF 165, map UE external identifiers to a UE's Subscription Permanent Identifier (SUPI) or another unique identifier, and send slice usage temporary barring information to NSSF 130. NEF 135 may be accessible to AF 165 via an N33 interface 137. A SUPI SMF 140 may perform session establishment, session modification, and/or session release, perform IP address allocation and management, perform Dynamic Host Configuration Protocol (DHCP) functions, perform selection and control of UPF 145, configure traffic steering at UPF 145 to guide the traffic to the correct destinations, perform lawful intercepts, charge data collection, support charging interfaces, control and coordinate of charging data collection, perform downlink data notification, manage roaming functionality, and/or perform other types of control plane processes for managing user plane data. SMF 140 may be accessible to UPF 145 via an N4 interface 147.

UPF 145 may maintain an anchor point for intra/inter-RAT mobility, maintain an external Protocol Data Unit (PDU) point of interconnect to a particular data network (e.g., data network 160), perform packet routing and forwarding, perform the user plane part of policy rule enforcement, perform packet inspection, perform lawful intercept, perform traffic usage reporting, perform QoS handling in the user plane, perform uplink traffic verification, perform transport level packet marking, perform downlink packet buffering, and/or perform other types of user plane processes. UPF 145 may connect to data network 160 using an N6 interface 152.

Devices, functions, and networks of environment 100 may be interconnected via wired and/or wireless connections. While FIG. 1 shows exemplary components of network environment 100, in other implementations, network environment 100 may include fewer components, different components, differently-arranged components, or additional components than depicted in FIG. 1. Additionally or alternatively, one or more components of network environment 100 may perform functions described as being performed by one or more other components of network environment 100.

Figure 2:
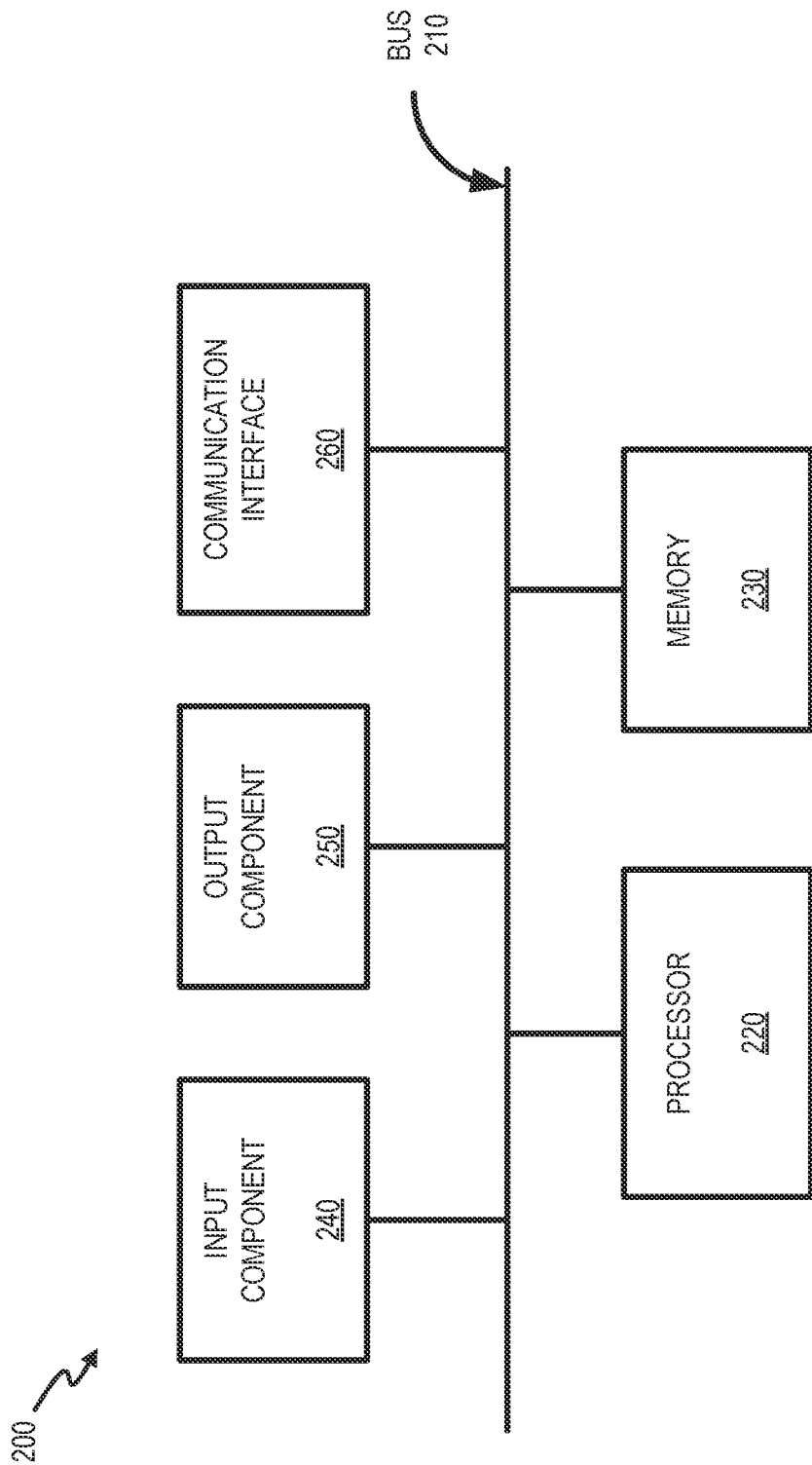
FIG. 2 shows a diagram of exemplary components that may be included in a network device that supports features described herein.

FIG. 2 is a diagram illustrating exemplary components of a device 200. Device 200 may correspond to or include, for example, UE 105, access station 115, AMF 125, NSSF 130, NEF 135, SMF 140, UPF 145, AF 160, or another component of wireless network 102. Alternatively or additionally, access station 115, AMF 125, NSSF 130, NEF 135, SMF 140, UPF 145, AF 160 may include one or more devices 200 and/or one or more components of device 200.

Device 200 may include a bus 210, a processor 220, a memory 230, an input component 240, an output component 250, and a communication interface 260. Although FIG. 2 shows exemplary components of device 200, in other implementations, device 200 may contain fewer components, additional components, different components, or differently arranged components than those depicted in FIG. 2. For example, device 200 may include one or more switch fabrics instead of, or in addition to, bus 210. Additionally, or alternatively, one or more components of device 200 may perform one or more tasks described as being performed by one or more other components of device 200.

Bus 210 may include a path that permits communication among the components of device 200. Processor 220 may include a processor, a microprocessor, or processing logic that may interpret and execute instructions. Memory 230 may include any type of dynamic storage device that may store information and instructions, for execution by processor 220, and/or any type of non-volatile storage device that may store information for use by processor 220. Input component 240 may include a mechanism that permits a user to input information to device 200, such as a keyboard, a keypad, a button, a switch, etc. Output component 250 may include a mechanism that outputs information to the user, such as a display, a speaker, one or more light emitting diodes (LEDs), etc.

Communication interface 260 may include a transceiver that enables device 200 to communicate with other devices and/or systems via wireless communications, wired communications, or a combination of wireless and wired communications. For example, communication interface 260 may include mechanisms for communicating with another device or system via a network. Communication interface 260 may include an antenna assembly for transmission and/or reception of RF signals. For example, communication interface 260 may include one or more antennas to transmit and/or receive RF signals over the air. Communication interface 260 may, for example, receive RF signals and transmit them over the air to UE 105/radio access station 115, and receive RF signals over the air from radio access station 115/UE 105. In one implementation, for example, communication interface 260 may communicate with a network and/or devices connected to a network. Alternatively or additionally, communication interface 260 may be a logical component that includes input and output ports, input and output systems, and/or other input and output components that facilitate the transmission of data to other devices.

Device 200 may perform certain operations in response to processor 220 executing software instructions contained in a computer-readable medium, such as memory 230. A computer-readable medium may be defined as a non-transitory memory device. A memory device may include space within a single physical memory device or spread across multiple physical memory devices. The software instructions may be read into memory 230 from another computer-readable medium or from another device. The software instructions contained in memory 230 may cause processor 220 to perform processes described herein. Alternatively, hard-wired circuitry may be used in place of or in combination with software instructions to implement processes described herein. Thus, implementations described herein are not limited to any specific combination of hardware circuitry and software.

Device 200 may include fewer components, additional components, different components, and/or differently arranged components than those illustrated in FIG. 2. As an example, in some implementations, a display may not be included in device 200. In these situations, device 200 may be a "headless" device that does not include input component 240. Additionally, or alternatively, one or more operations described as being performed by a particular component of device 200 may be performed by one or more other components, in addition to or instead of the particular component of device 200.

Figure 3B:
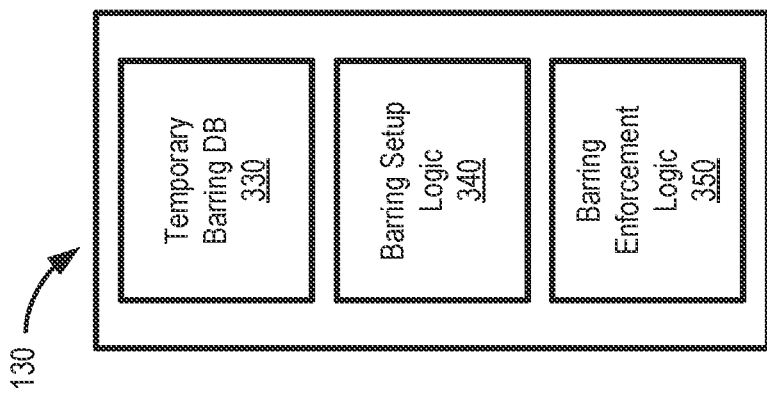
FIG. 3B is a block diagram showing logical components of a Network Slice Selection Function (NSSF) for the network slice usage barring service.
Figure 3A:
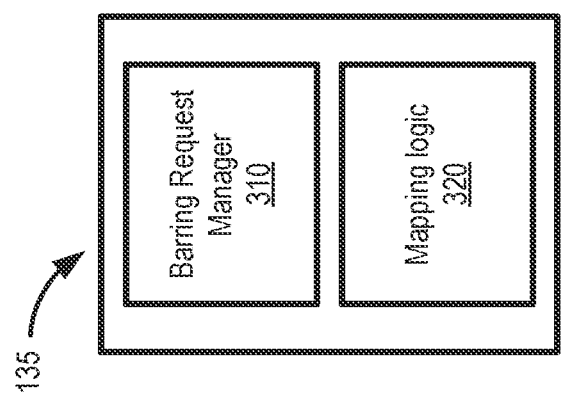
FIG. 3A is a block diagram showing logical components of a Network Exposure Function (NEF) for a network slice usage barring service.

FIG. 3A is a block diagram illustrating some exemplary logical components of NEF 135. As shown in FIG. 3A, NEF 135 may include a barring request manager 310 and mapping logic 320. The components of FIG. 3A may be implemented, for example, by processor 220 in conjunction with memory 230.

Barring request manager 310 may receive and manage barring requests from AF 165. For example, an AF 165 may identify a rogue user (e.g., who violates the terms and conditions that the user agreed to when signing up for an application) to be temporarily barred as part of a penalty in the application's terms and conditions. Assuming AF 165 is eligible for the network slice usage barring service, AF 165 may provide a barring request to barring request manager 310. The barring request may include a UE external ID (e.g., a username, a domain name, a combination of username and domain name, etc., associated with the rogue user) or another unique UE identifier and indicate a temporary barring time (e.g., a timestamp when the temporary barring would be lifted). If necessary, barring request manager 310 may refer to mapping logic to match the external ID to a network identifier, such a SUPI. Barring request manager 310 may also refer to mapping logic 320 to identify NSSAI for the requesting AF 165. Barring request manager 310 may provide barring request parameters, including the UE SUPI, the NSSAI, and the temporary barring time, to NSSF 130.

According to an implementation, NEF 135 (e.g., barring request manager 310) may use a modified Nnssf interface 132 to forward barring request parameters to NSSF 130. More particularly, NEF 135 may use the Nnssf_NSSAI Availability service with interface Nnssf that is enhanced to support parameters for the network slice usage barring service. NEF 135 may send an HTTP PUT message to NSSF 130 to specify what network slice(s) is barred for what subscribers.

Figure 5A:
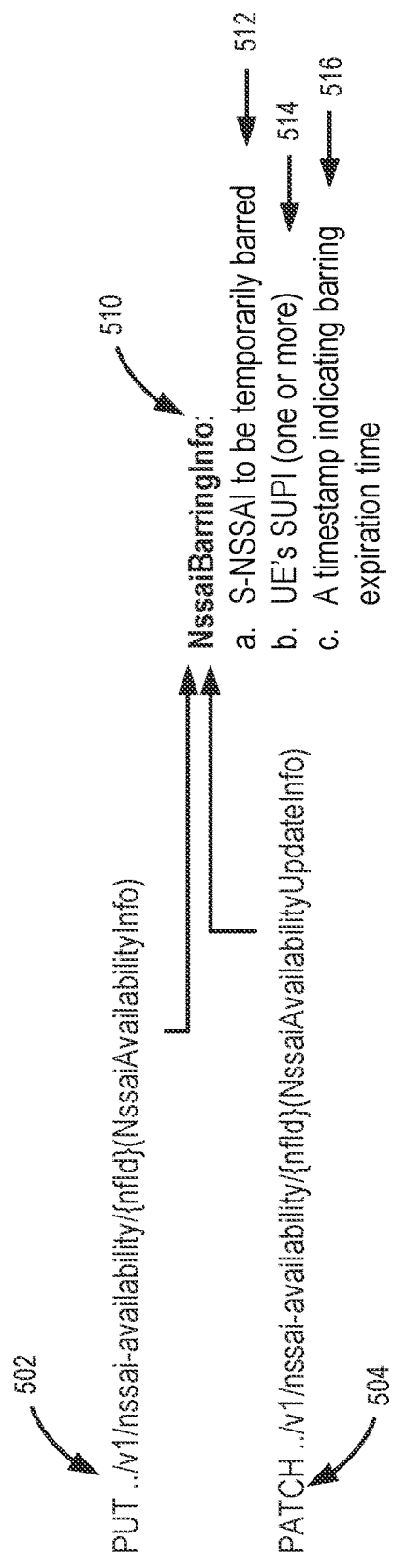
FIG. 5A is a diagram illustrating data of exemplary barring information messages provided by the NEF in the network slice usage barring service.

FIG. 5A is a diagram illustrating data of exemplary barring information messages provided by NEF 135 in the network slice usage barring service. As illustrated in FIG. 5A, for example, a PUT message 502 may include a payload in the message body with NssaiAvailabilityInfo. According to an implementation, the NssaiAvailabilityInfo may include a new data structure, referred to herein as NssaiBarringInfo 510. NssaiBarringInfo 510 may include, for example, fields 512, 514, and 516 with the following attributes. Field 512 may indicate a single NSSAI (S-NSSAI) to which access is to be temporarily barred (or multiple S-NSSAI). Field 514 may indicate a SUPI of the UE to be barred from the network slice. In other implementations, field 514 may include multiple SUPIs for the network slice in field 512. Field 516 may provide a timestamp indicating the end time of the barring.

As further shown in FIG. 5A, according to anther implementation, AF 165 may change/update a barring request. Thus, NEF 135 can later use the Nnssf_NSSAI Availability service and send a PATCH message (e.g., PATCH message 504) to NSSF 135 to update the temporary barring time frame for a given slice as necessary upon request from AF 165. Similar to PUT message 502, PATCH message 504 may include NssaiBarringInfo 510 with fields 512, 514, and 516 described above.

Referring again to FIG. 3A, mapping logic 320 may use a data structure to map an external ID of a UE device 105 to a corresponding SUPI that maybe recognized within wireless network 102. Mapping logic 320 may also map an AF 165 (e.g., that submits a barring request) to a corresponding NSSAI. According to one implementation, mapping logic 310 may include a data structure to permit cross-referencing of external identifiers and SUPIs, and another data structure to permit cross-referencing of AF IP addresses to NSSAI. In another implementation, mapping logic 310 may communicate with another network function (e.g., a UDM) that stores subscriber information to retrieve a corresponding SUPI for a received external ID.

FIG. 3B is a block diagram illustrating some exemplary logical components of NSSF 130. As shown in FIG. 3B, NSSF 130 may include a temporary barring database 330, barring setup logic 340, and barring enforcement logic 350. The components of FIG. 3B may be implemented, for example, by processor 220 in conjunction with memory 230.

Temporary barring database 330 may include a data structure of parameters for active temporary network slice barring. For example, for each unexpired baring request generated by an AF 165 (e.g. and forwarded via NEF 130), temporary barring database 330 may include an S-NSSAI, SUPI, and timestamp. According to an implementation, temporary barring database 330 may be updated for each PUT message 502 and PATCH message 504 that includes NssaiBarringInfo 510.

Barring setup logic 340 may provide slice baring configuration information to AMF 125. For example, when NSSF 130 receives a PUT message (e.g., PUT message 502) with NssaiBarringInfo 510, barring setup logic 340 may store the barring parameters in temporary barring database 330. Using the Nnssf_NSSAI Availability service, NSSF 130 may notify AMF 125 of the barring parameters via a POST message. The POST message may include payload with NssaiBarringInfo 510, similar to PUT message 502 and PATCH message 504 described above. Additionally, in some implementations, the POST message payload may include a temporary barring indicator for the S-NSSAI of field 512.

Barring enforcement logic 350 may review and respond to queries from AMF 125 to enforce network slice usage barring. When UE 105 requests a connection to AF 165 (e.g., based on the URSP stored at UE 105), UE 105 will send a PDU session establishment request to AMF via N1 interface 112. AMF 125 may then use the Nnssf_NSSelection service to query (e.g., an HTTP GET message) NSSF 130 for the allowed slice via N22 interface 127. AMF 125 may include a new additional SUPI attribute (e.g., the SUPI of UE 105) in the GET message. NSSF 130 may receive the GET message, and barring enforcement logic 350 may check if the SUPI and requested S-NSSAI are in temporary barring database 330. If so, barring enforcement logic 350 may inform AMF 125 that the UE is barred from the requested network slice.

NSSF 130 (e.g., barring enforcement logic 350) may send a Not Acceptable message to AMF 125 to indicate a UE is barred from using the requested network slice.

Figure 5B:
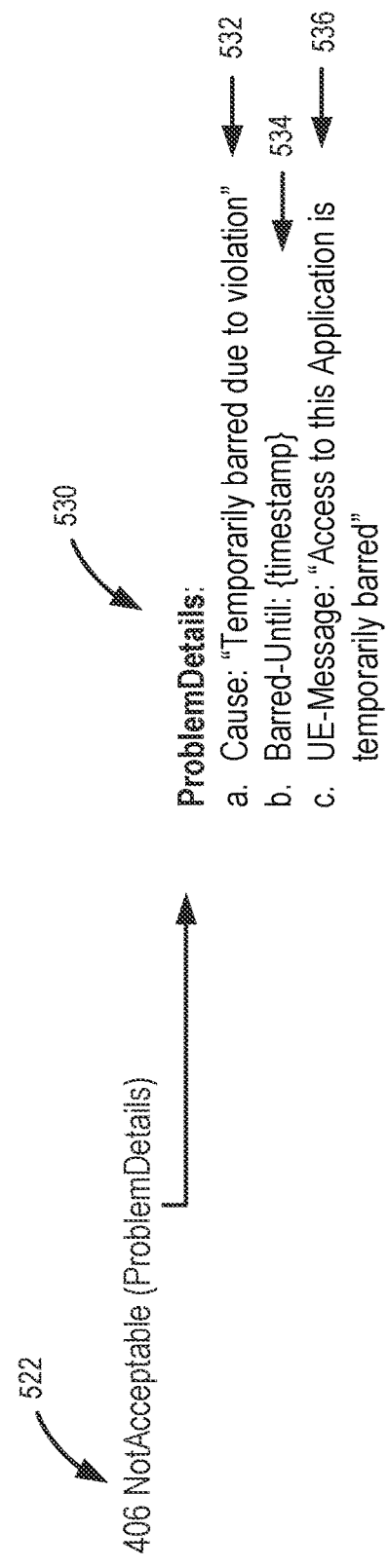
FIG. 5B is a diagram illustrating data of an exemplary barring instruction message provided by the NSSF in the network slice usage barring service.

FIG. 5B is a diagram illustrating data of an exemplary barring instruction message provided by the NSSF 130 in the network slice usage barring service. As illustrated in FIG. 5B, for example, an error code 406 "Not Acceptable" message 522 may include a payload in the message body with a problem description ("ProblemDetails"). According to an implementation, the problem description may include a new data structure, referred to herein as ProblemDetails 530. ProblemDetails 530 may include, for example, fields 532, 534, and 536 with the following attributes. Field 532 may include a cause attribute, which may be set to "Temporarily barred due to violation," for example. Field 534 may indicate a barred until attribute, which may be set to a timestamp when the bar is to be lifted. Field 536 may be a UE-Message attribute, which may include a default text message to be displayed on the UE (e.g., "Access to this application is temporarily barred").

Figure 4B:
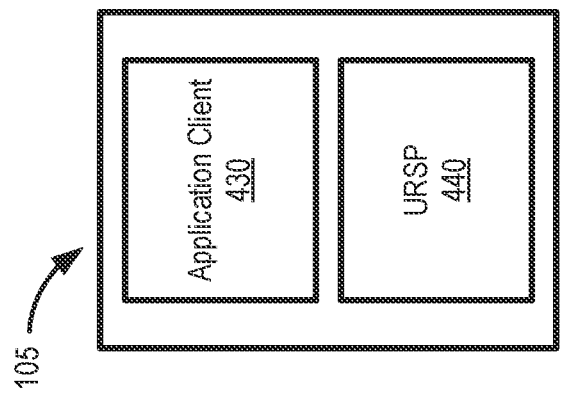
FIG. 4B is a block diagram showing logical components of a User Equipment (UE) device for the network slice usage barring service.
Figure 4A:
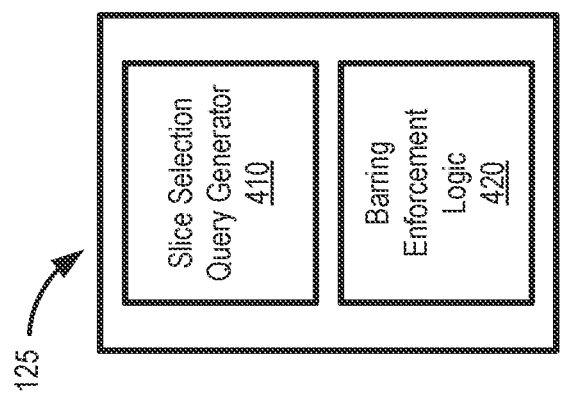
FIG. 4A is a block diagram showing logical components of a Access and Mobility Management Function (AMF) for the network slice usage barring service.

FIG. 4A is a block diagram illustrating some exemplary logical components of AMF 125. As shown in FIG. 4A, AMF 125 may include a slice selection query generator 410 and barring enforcement logic 420. The components of FIG. 4A may be implemented, for example, by processor 220 in conjunction with memory 230.

Slice selection query generator 410 may receive and manage a PDU session establishment request from UE 105. Upon receiving a PDU session establishment request slice selection query generator 410 may use an Nnssf_NS Selection service to query NSSF 130 for the allowed slice via N22 interface 122. According to an implementation, the query may be in the form of a GET message which includes a new additional SUPI attribute in the GET message. Slice selection query generator 410 may obtain the SUPI for UE 105 from, for example, the PDU session establishment request or a cross-reference with another unique identifier for UE 105.

Barring enforcement logic 420 may enforce barring of UE 105 from a network slice for existing sessions and subsequent session requests within the barring period. For example, upon receiving slice baring configuration information from barring setup logic 340, barring enforcement logic 420 may check if UE 105 currently has PDU session established with the barred S-NSSAI slice. If so, barring enforcement logic 420 may invoke a PDU release procedure. Barring enforcement logic 420 may also include a backoff timer with a barred-until value (e.g., consistent with the slice baring configuration information from barring setup logic 340).

As another example, barring enforcement logic 420 may receive a negative query response (e.g., not acceptable message 522) from NSSF 130 in response to a query from slice selection query generator 410. Barring enforcement logic 420 may, thus, reject the PDU session establishment request from UE 105. For example, barring enforcement logic 420 may send a PDU session establishment reject message to UE 105. The reject message may include, for example, a UE-Message (e.g., text from field 536 of Not Acceptable message 522) in an ePCO (extended Protocol Configuration Options) information element (IE). Additionally, barring enforcement logic 420 may translate the Barred-Until value (e.g., from field 534 of Not Acceptable message 522) to a timer value, and include the timer value in a backoff IE of the reject message.

FIG. 4B is a block diagram illustrating some exemplary logical components of UE 105. As shown in FIG. 4B, UE 105 may include an application client 430 and URSP 440. The components of FIG. 4B may be implemented, for example, by processor 220 in conjunction with memory 230.

UE 105 may be configured to execute various types of software (e.g., applications, programs, etc.), such as an application client 430 for an application that receives service from AF 165 of data network 160. When application client 430 would like to connect to AF 165, application client 430 may cause UE 105 to send a PDU session establishment request to AMF 125 (e.g., via N1 interface 112) based on the URSP 440 stored in UE 105.

Although FIG. 3A-4B show exemplary logical components of UE 105, AMF 125, NSSF 130, and NEF 135, in other implementations, UE 105, AMF 125, NSSF 130, and NEF 135 may include fewer components, different components, differently arranged components, or additional components than depicted in FIGS. 3A-4B. Additionally or alternatively, one or more components of UE 105, AMF 125, NSSF 130, and NEF 135 may be included in another of UE 105, AMF 125, NSSF 130, or NEF 135. For example, temporary barring database 330 may be stored or jointly accessed AMF 125 or NEF 135.

Figure 6:
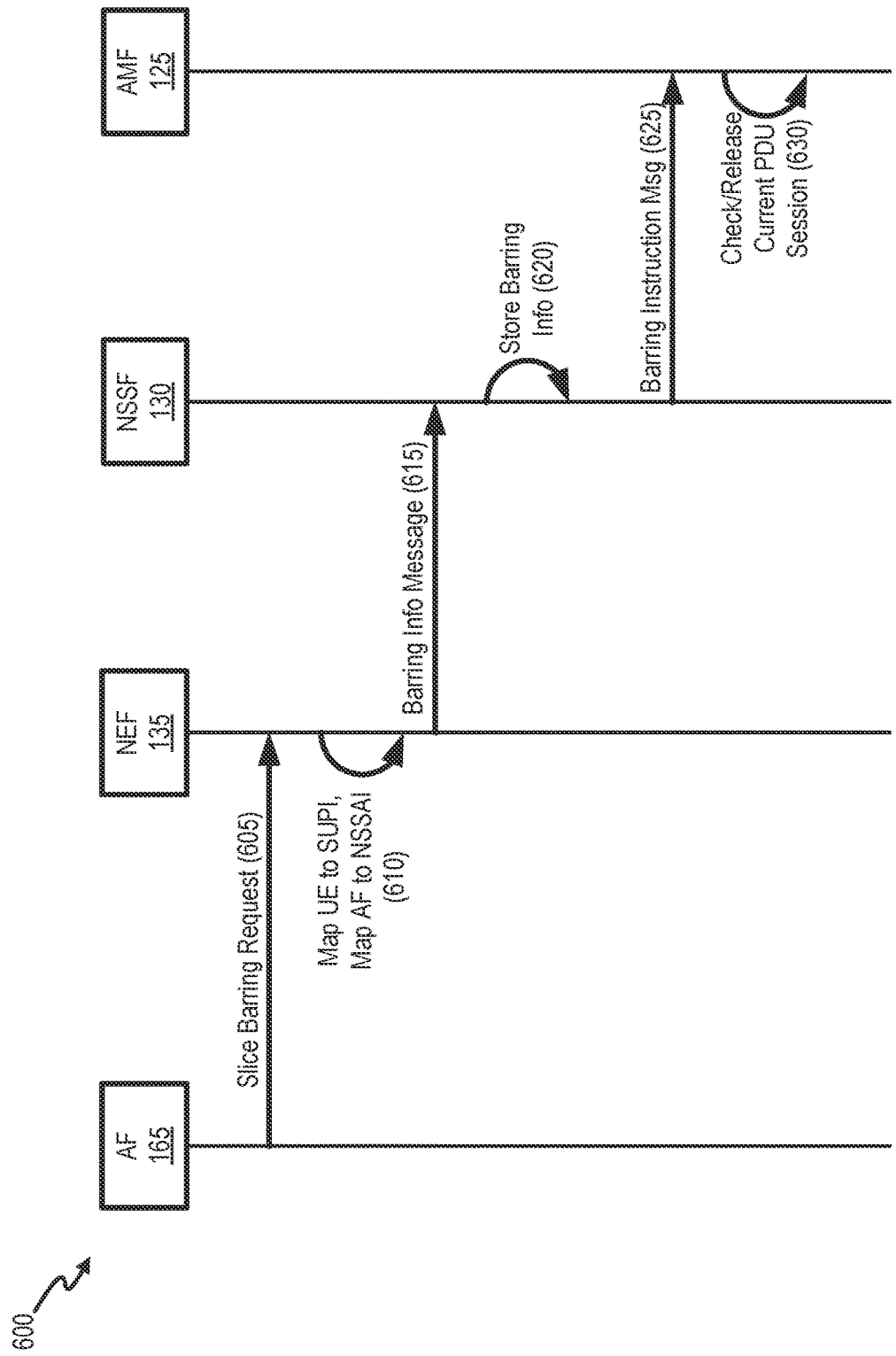
FIG. 6 is a diagram showing exemplary communications for configuring temporary network slice usage barring in a portion of the network environment of FIG. 1.

FIG. 6 is a diagram showing exemplary communications for configuring temporary network slice usage barring in a portion 600 of network environment 100. As shown in FIG. 6, network portion 600 may include AMF 125, NSSF 130, NEF 135, and AF 165.

Referring to FIG. 6, when an AF 165 identifies a user to be temporarily barred (e.g., as part of a penalty or terms and conditions violation), AF 165 may send a slice barring request 605 to NEF 135. Slice barring request 605 may be provided, for example, via N33 interface 137. Slice barring request 605 may include a unique identifier for UE 105 (such as an external ID) and a temporary barring time, indicating when the temporary barring can be lifted.

NEF 135 may receive slice barring request 605 and map the UE and AF to network information, as indicated at reference 610. For example, if necessary, NEF 135 may map the unique identifier from slice barring request 605 to a SUPI for UE 105. Additionally, NEF 135 may map AF 165 to a corresponding slice identifier or NSSAI (e.g., corresponding to the network slice to which UE 105 is to be temporarily barred). Using an Nnssf_NSSAI Availability service, NEF 135 may then send a barring info message 615 to NSSF 130 to specify what slice(s) are temporarily barred for a UE 105. For a new slice barring request, barring information message 615 may correspond to, for example, PUT message 502 with NssaiBarringInfo 510. For an update to an existing slice barring request, barring info message 615 may correspond to, for example, PATCH message 504 with NssaiBarringInfo 510.

NSSF 130 may receive barring info message 615 and may store the barring information (e.g., in temporary barring database 330), as indicated at reference 620. Using the Nnssf_NSSAI Availability service, NSSF 135 may then send a barring instruction message 625 to AMF 125 (e.g., the AMF corresponding to the network slice to which UE 105 is to be temporarily barred). Barring instruction message 625 may be provided, for example, as a POST message that includes the parameters from NssaiBarringInfo 510 and a temporary barring indicator for the S-NSSAI.

AMF 125 may receive barring instruction message 625, and, in response, AMF 125 may check 630 if UE 105 currently has PDU session established with the barred S-NSSAI. If so, AMF 125 may invoke a PDU release procedure to remove UE 105 from the barred network slice. In initiating the PDU session release, AMF 125 may include a backoff timer with a Barred-until value. For example, AMF may provide to UE 105 parameters from ProblemDetails 530 described above.

Figure 7:
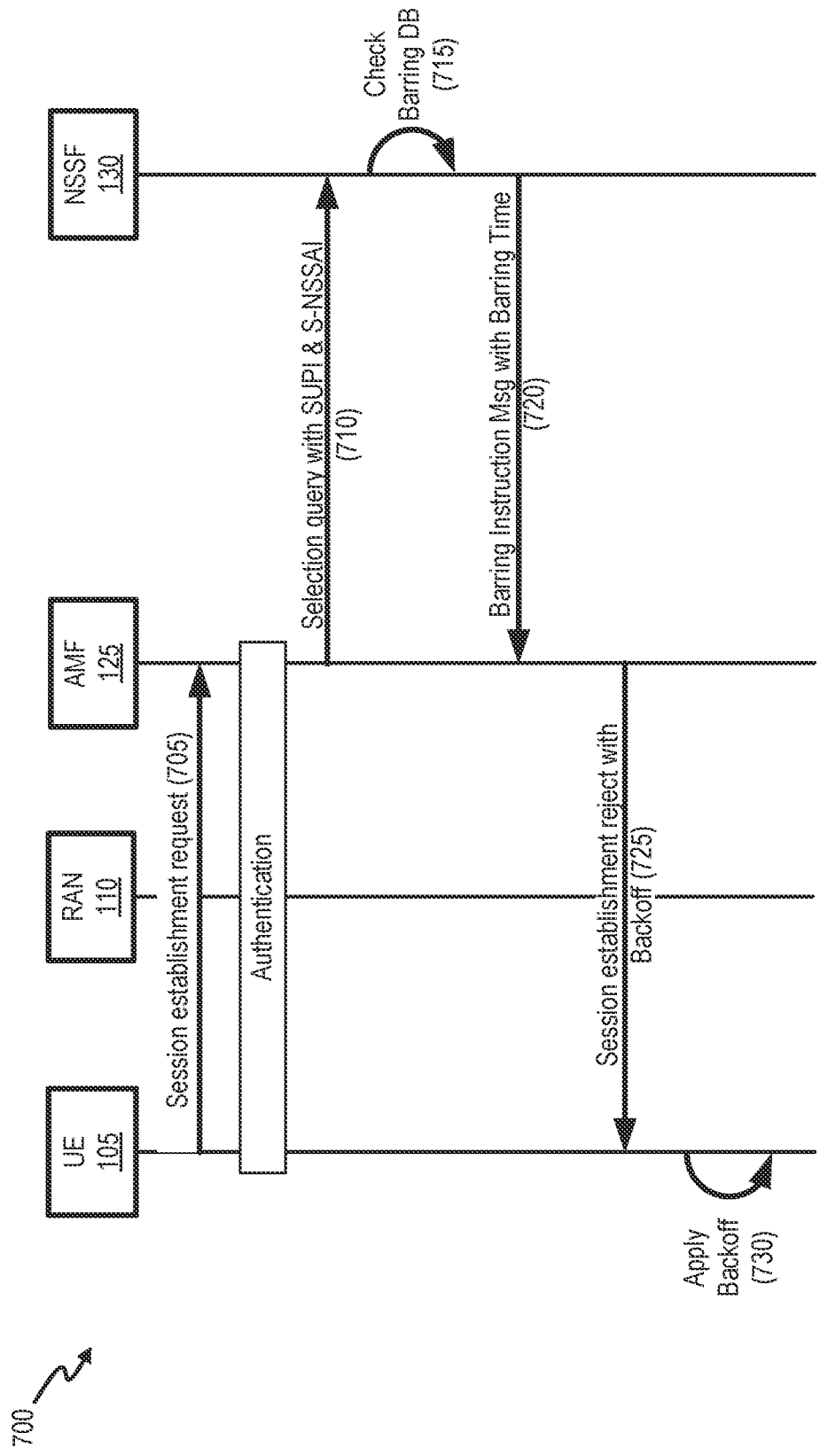
FIG. 7 is a diagram showing exemplary communications for enforcing temporary network slice usage barring in another portion of the network environment of FIG. 1.

FIG. 7 is a diagram showing exemplary communications for enforcing temporary network slice usage barring in a portion 700 of network environment 100. As shown in FIG. 7, network portion 700 may include UE 105, RAN 110, AMF 125, and NSSF 130.

Referring to FIG. 7, UE 105 may be configured with URSP to associate one network slice with one AF 165. Assume that UE 105 has been temporarily banned from accessing that network slice (e.g., according to procedures described above in connection with FIG. 6).

When UE 105 attempts to connect to AF 165, UE 105 may send a PDU session establishment request 705 to AMF 125 via RAN 110. Session establishment request 705 may include S-NSSAI for the network slice associated with AF 165. As part of an authentication procedure related to session establishment request 705, AMF 125 may obtain a SUPI from UE 105.

Using N22 interface 127, AMF 125 may use the Nnssf_NS Selection service to provide a selection query 710 to NSSF 130 for the requested S-NSSAI. Selection query 710, which may be in the form of a GET message, may include a SUPI attribute for UE 105 along with the S-NSSAI.

NSSF 130 may receive selection query 710, and, in response, may check if the SUPI and requested S-NSSAI of selection query 710 are in temporary barring database 330. If there is no match, NSSF 130 may return an OK message (not shown) to AMF 125. If there is a match between selection query 710 and temporary barring database 330, NSSF 130 may return a barring instruction message 720 to AMF 125. Barring instruction message 720 may be in the form of a negative query response (e.g., Not Acceptable message 522 with a ProblemDetails 530) including the corresponding barring time from temporary barring database 330.

AMF 125 may receive barring instruction message 720, and, in response, reject session establishment request 705. For example, AMF 125 may send to UE 105 a session establishment rejection 725 including a backoff period. The backoff period may be calculated, for example, based on the barring time in barring instruction message 720 (e.g., barred-until field 534).

UE 105 may receive session establishment rejection 725 and implement the backoff period, as indicated at reference 730. For example, UE 105 will not attempt to request PDU session establishment for the S-NSSAI until the backoff timer expires.

Figure 8:
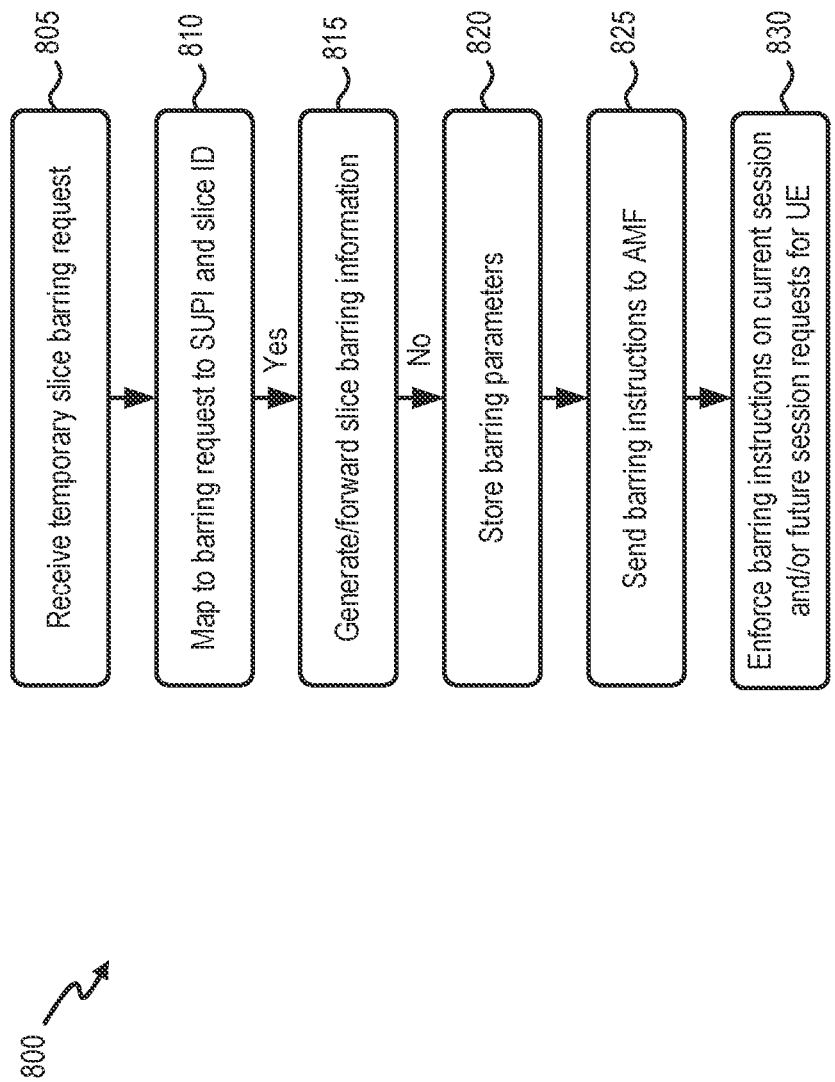
FIG. 8 is a flow diagram that illustrates an exemplary process for implementing a network slice usage barring service, according to an implementation described herein.

FIG. 8 is a flow diagram illustrating an exemplary process 800 for providing a network slice usage barring service. In one implementation, process 800 may be performed by NSSF 130 and NEF 135. In another implementation, process 800 may be implemented by NSSF 130 and NEF 135 and one or more other devices in network environment 100, such as AMF 125 or another device in core network 120.

Referring to FIG. 8, process 800 may include receiving a temporary slice barring request (block 805), mapping the barring request to a SUPI and a slice identifier (block 810), and generating and forwarding slice barring information (block 815). For example, AF 165 may send to NEF 135 a slice baring request. The slice barring request may include a barring expiration time and an external ID for a UE to be barred from accessing the AF. NEF 135 may map the external ID to a SUPI and map the AF to a network slice ID (e.g., S-NSSAI). Using the SUPI and slice ID, NEF 130 may generate barring information message, which may be forwarded to NSSF 130.

Process 800 may further include storing barring parameters (block 820), sending the barring instructions to an AMF associated with the slice ID (block 825), and enforcing the barring instructions on a current PDU session and/or future session requests for the UE (block 830). For example, NSSF 130 may receive the barring information message from NEF 135. NSSF 130 may extract and store the barring parameters from the barring information message, including the SUPI for the UE device, the slice ID, and the barring expiration time. NSSF 130 may also send barring instructions to the AMF 125 that is associated with the slice ID. The barring instructions may include a barring indication, the slice ID (if needed), and the SUPI for the UE. AMF 125 may receive the barring instructions and enforce the barring instructions for a current PDU session for the UE (e.g., if on the barred slice) and for any future session requests by the UE that may occur prior to the barring expiration time.

The foregoing description of implementations provides illustration and description, but is not intended to be exhaustive or to limit the invention to the precise form disclosed. Modifications and variations are possible in light of the above teachings or may be acquired from practice of the invention. For example, while a series of blocks have been described with regard to FIG. 8, and message/operation flows with respect to FIGS. 6 and 7, the order of the blocks and message/operation flows may be modified in other embodiments. Further, non-dependent blocks may be performed in parallel.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

As set forth in this description and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method comprising:
   receiving, by a network exposure function (NEF) in a core network and from an application function (AF) outside the core network, a slice barring request identifying a user equipment (UE) device and a barring expiration time;
   mapping, by the core network, the AF to a network slice identifier (ID);
   storing, by the core network, barring parameters based on the slice barring request and the network slice ID; and
   enforcing, by the core network, barring of the UE device from a network slice corresponding to the network slice ID based on the barring parameters.

2. The method of claim 1, further comprising:
   mapping a UE identifier in the slice barring request to a unique subscriber identifier for the core network.

3. The method of claim 1, wherein the enforcing comprises:
   initiating release of an active session for the UE device on the network slice in response to the slice barring request.

4. The method of claim 1, wherein the enforcing comprises:
   receiving a session establishment request from the UE device;
   matching parameters from the session establishment request to the barring parameters; and
   rejecting the session establishment request based on the matching.

5. The method of claim 4, wherein the rejecting includes sending information that indicates to the UE device a backoff period that corresponds to the barring expiration time.

6. The method of claim 1, further comprising:
   sending a barring instruction message to an access and mobility management function (AMF) device associated with the network slice, wherein the barring instruction message includes a unique subscriber identifier for the UE device and the barring expiration time.

7. The method of claim 1, wherein storing the barring parameters includes:
   storing a single network slice selection assistance information (S-NSSAI) and a temporary barring indicator.

8. The method of claim 1, wherein receiving the slice barring request includes:
   receiving the slice barring request via an N33 interface.

9. A system comprising:
   one or more processors in a core network configured to:
      receive, by a network exposure function (NEF) in the core network and from an application function (AF) outside the core network, a slice barring request identifying a user equipment (UE) device and a barring expiration time;
      map the AF to a network slice identifier (ID);
      store barring parameters based on the slice barring request and the network slice ID; and
      enforce barring of the UE device from a network slice corresponding to the network slice ID based on the barring parameters.

10. The system of claim 9, wherein the one or more processors are further configured to:
    map a UE identifier in the slice barring request to a unique subscriber identifier for the core network.

11. The system of claim 9, wherein, when enforcing barring, the one or more processors are further configured to:
    initiate release of an active session for the UE device on the network slice in response to the slice barring request.

12. The system of claim 9, wherein, when enforcing barring, the one or more processors are further configured to:
    receive a session establishment request from the UE device;
    match parameters from the session establishment request to the barring parameters; and
    reject the session establishment request based on the matching.

13. The system of claim 12, wherein, when rejecting the session establishment request, the one or more processors are further configured to:
    send, to the UE device, a backoff period that corresponds to the barring expiration time.

14. The system of claim 9, wherein the one or more processors are further configured to:
    send a barring instruction message to an access and mobility management function (AMF) device associated with the network slice, wherein the barring instruction message includes a unique subscriber identifier for the UE device and the barring expiration time.

15. The system of claim 9, wherein the barring parameters include:
    single network slice selection assistance information (S-NSSAI), and
    a temporary barring indicator.

16. The system of claim 9, wherein, when receiving the slice barring request, the one or more processors are further configured to:
    receive the slice barring request via an N33 interface.

17. A non-transitory computer-readable medium containing instructions executable by at least one processor in a core network, the computer-readable medium comprising the instructions for:
    receiving, by a network exposure function (NEF) in a core network and from an application function (AF) outside the core network, a slice barring request identifying a user equipment (UE) device and a barring expiration time;
    mapping, by the core network, the AF to a network slice identifier (ID);
    storing, by the core network, barring parameters based on the slice barring request and the network slice ID; and
    enforcing, by the core network, barring of the UE device from a network slice corresponding to the network slice ID based on the barring parameters.

18. The non-transitory computer-readable medium claim 17, further comprising instructions for:
    mapping a UE identifier in the slice barring request to a unique subscriber identifier for the core network.

19. The non-transitory computer-readable medium claim 17, further comprising instructions for:
    sending a barring instruction message to an access and mobility management function (AMF) device associated with the network slice, wherein the barring instruction message includes a unique subscriber identifier for the UE device and the barring expiration time.

20. The non-transitory computer-readable medium claim 17, wherein the instructions for enforcing barring of the UE device further comprise instructions for:
   initiating release of an active session for the UE device on the network slice in response to the slice barring request, or
   rejecting a session establishment request from the UE device for the network slice.

* * * * *